United States Patent
Frohwein et al.

(10) Patent No.: US 10,769,637 B1
(45) Date of Patent: Sep. 8, 2020

(54) SYSTEM, METHOD AND COMPUTER READABLE STORAGE TO UTILIZE OPTICAL RECOGNITION TO DETECT A TRANSACTION INCONSISTENCY

(71) Applicants: Rob Frohwein, Atlanta, GA (US); Kathryn Petralia, Atlanta, GA (US)

(72) Inventors: Rob Frohwein, Atlanta, GA (US); Kathryn Petralia, Atlanta, GA (US)

(73) Assignee: Kabbage, Inc., Atlanta, GA (US)

( * ) Notice: Subject to any disclaimer, the term of this patent is extended or adjusted under 35 U.S.C. 154(b) by 0 days.

(21) Appl. No.: 15/008,502

(22) Filed: Jan. 28, 2016

(51) Int. Cl.
*G06Q 20/34* (2012.01)
*G06Q 20/40* (2012.01)

(52) U.S. Cl.
CPC .......... *G06Q 20/409* (2013.01); *G06Q 20/34* (2013.01)

(58) Field of Classification Search
CPC ........ G06Q 20/20; G06Q 20/34; G06Q 20/40; G06Q 20/409; G06Q 20/4014
USPC ......................................................... 235/380
See application file for complete search history.

(56) References Cited

U.S. PATENT DOCUMENTS

| | | | |
|---|---|---|---|
| 7,006,986 B1* | 2/2006 | Sines .................. | G06Q 20/382 705/26.35 |
| 2005/0242172 A1* | 11/2005 | Murata ................. | G06Q 20/10 235/380 |
| 2007/0215698 A1* | 9/2007 | Perry ..................... | G06Q 20/20 235/380 |
| 2008/0298573 A1* | 12/2008 | Monk .................. | G06Q 10/067 379/189 |
| 2009/0283586 A1* | 11/2009 | Cecere .................. | G06Q 20/20 235/380 |
| 2010/0299262 A1* | 11/2010 | Handler ................. | G06Q 20/10 705/44 |
| 2015/0058220 A1* | 2/2015 | Cazanas ................ | G06Q 20/40 705/44 |

* cited by examiner

*Primary Examiner* — Laura A Gudorf
(74) *Attorney, Agent, or Firm* — Muskin and Farmer LLC

(57) ABSTRACT

A method, apparatus, and computer readable storage utilize optical character recognition to authentic a transaction. Optical character recognition is used on a physical instrument and data obtained from the optical character recognition is used to query a remote database. Identification information from the remote database is compared with data obtained from the optical character recognition to determine whether there is an inconsistency of data.

16 Claims, 4 Drawing Sheets

SYSTEM, METHOD AND COMPUTER READABLE STORAGE TO UTILIZE OPTICAL RECOGNITION TO DETECT A TRANSACTION INCONSISTENCY

BACKGROUND OF THE INVENTION

Field of the Invention

The present general inventive concept is directed to a method, apparatus, and computer readable storage medium directed to method, apparatus, and computer readable storage to automatically detect a transaction inconsistency using optical recognition.

Description of the Related Art

Electronic transactions are commonplace in this day and age. With the rise in electronic transactions is also a raise in electronic fraud. What is needed are improved methods in order to detect when a fraudulent electronic transaction (e.g., a credit card payment) may be taking place.

SUMMARY OF THE INVENTION

It is an aspect of the present invention to provide an improved fraud detection system.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
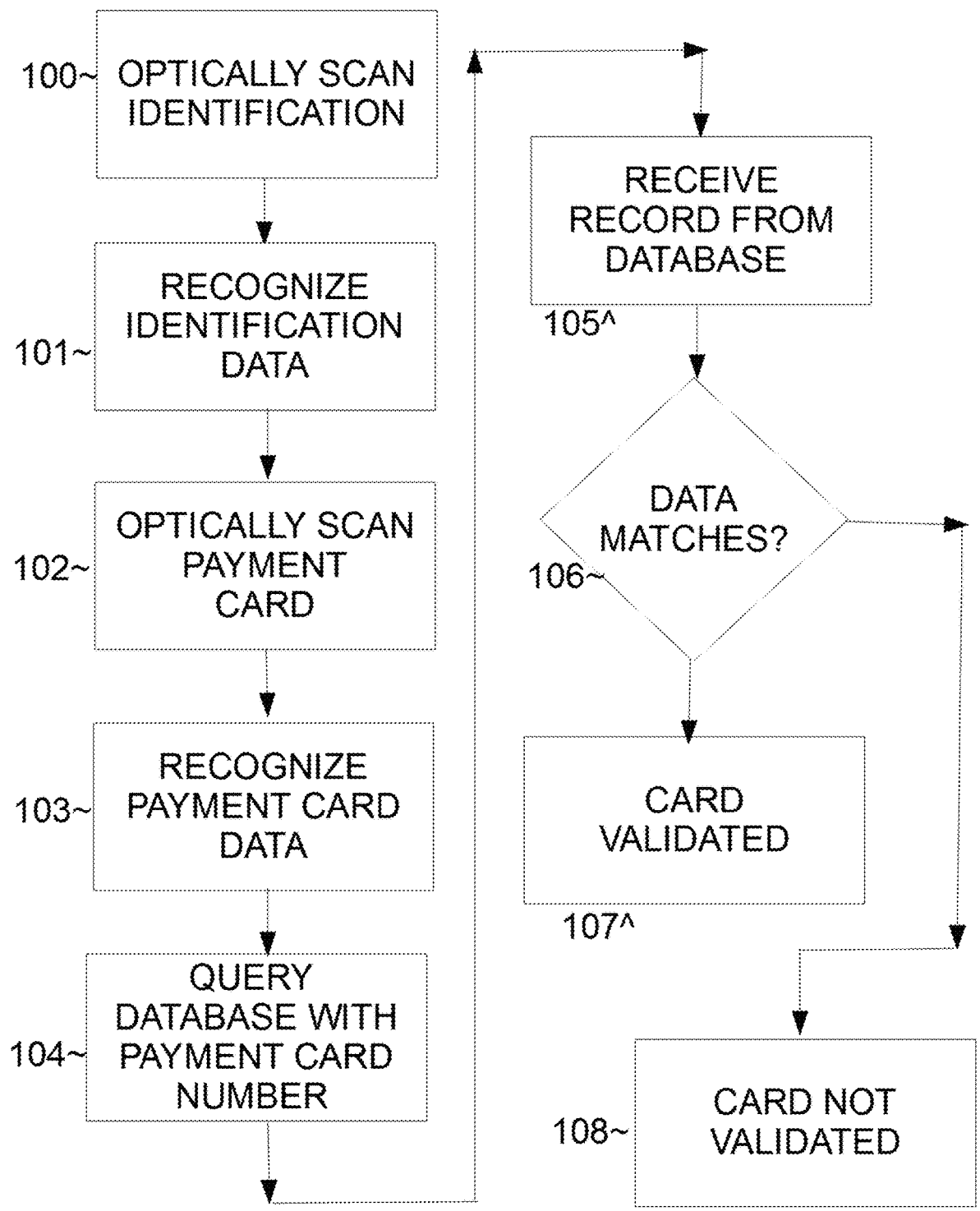
FIG. 1 is a flowchart illustrating an exemplary method to detect a transaction inconsistency, according to an embodiment.

Reference will now be made in detail to the presently preferred embodiments of the invention, examples of which are illustrated in the accompanying drawings, wherein like reference numerals refer to like elements throughout.

The present inventive concept relates to a method, apparatus, and computer readable storage medium to implement a fraud detection mechanism. In an embodiment, a customer would be at a cashier and wishes to pay by a payment card.

A payment card can be a plastic card which can be a credit card, debit card, stored value card, bitcoin card.

A credit card can be a VISA, MASTERCARD, AMERICAN EXPRESS, DISCOVER, card which can be accepted at millions of locations worldwide. Any other credit cards and/or networks can be used as well. A transaction with such a card is charged against a credit account owned by the user to which the user should pay off (either immediately or over time along with an interest surcharge).

A debit card is a card in which is associated with a bank account and can also be associated with VISA, MASTERCARD, etc., but the money actually is debited out of the user's bank account and no credit is used. A processor would process the transaction using the VISA or MASTERCARD infrastructure but instead of the amount being further processed by a credit card the amount is processed by the user's bank (issuer of the debit card) to deduct the respective amount.

A stored value card actually stores any value on the card itself. Examples of stored value cards are transit system fare-cards, cafeteria cards, etc. Since the value is stored on the card itself, there is no need for a remote server to query in order to check on the value of the card. Data representing the value on a stored value card would be encrypted and stored on the stored value card. A virtual stored value card would store the same data that would be stored on a physical stored value card but on a computer memory (e.g., flash memory on a mobile phone) where it can be transmitted to a stored value card reader.

A bitcoin card is a card that operates like a VISA, MASTERCARD, etc., but the funds are paid from a bitcoin account that is funded in bitcoins. Bitcoins are a well-known cryptocurrency. In this manner, charges made by the card are not paid for in dollars but are taken in bitcoins from the user's account (which can be a bit coin wallet). When a charge is made, the amount bitcoins equivalent to the charge would be automatically sold in order to fund the charge made.

FIG. 1 is a flowchart illustrating an exemplary method to detect a transaction inconsistency, according to an embodiment.

In operation 100, an identification (e.g., a driver's license, passport, or any other type of official identification) of the customer is scanned. For example, a cashier can use an optical scanner to take a picture of the identification and then it is digitized.

From operation 100, the method proceeds to operation 101, which optically recognizes identification data on the identification using optical character recognition (OCR). The identification data can comprise any combination of the name, address, date of birth, etc. In another embodiment, a casher can simply look at the identification and type in the name on the identification into the computer. In any embodiment, the cashier should confirm that the identification provided by the customer is really the customer (e.g., by making sure the photograph matches the customer, etc.)

From operation 101, the method proceeds to operation 102, which optically scans a payment card being presented for a purchase. This could be done using a camera, scanner, etc. to digitize an image of the credit card.

From operation 102, the method proceeds to operation 103, which uses optical character recognition to recognize payment card data. Payment card data can comprise any combination of the payment card number, expiration date, name on the card, etc. In another embodiment, the cashier can type in the payment card number (and any other information) printed on the front of the card.

In an embodiment, the first 4-6 digits of the number on the card can also be recognized (this is referred to has the BIN or Bank Identifying Number) along with the bank name printed on the card. The BIN is used to identify the actual bank issuing the card. In an embodiment, fraud can be detected when the bank associated with the BIN on the card does not match the bank name printed on the card (meaning that the card is fake). In an embodiment, the customer can be requested to provide access to the bank account matching the BIN (or the bank name printed on the card) by providing the login/password to confirm the bank identified is legitimate (if the customer can provide access to their account which is at the same bank identified on the card).

From operation 103, the method proceeds to operation 104, which queries a database with some of the payment card data to identify a particular record at the database. The payment card data can typically be the payment card number and/or the name on the payment card. The report can be any type of report which contains information about a person with whom the payment card data is associated with. This would typically be the owner of the payment card. The report can, for example, be a credit report which would contain the name of the owner of the account associated with the payment card number. A database (such as a credit reporting agency) stores credit reports on virtually every American citizen. In operation 103, a record at the database (e.g., credit reporting agency) is requested via the Internet using the payment card data. The record can be a credit report on the customer (owner of the identification and the payment card).

From operation 104, the method proceeds to operation 105, which receives the requested record (e.g., report) from the database. The report would typically have data associated with the customer (the presumed owner) of the payment card. The data can be, for example, credit card accounts associated with the customer, the customer's address. The report can be scraped in order to identify report data which is particular relevant data (e.g., the customer's full name, address, etc.) For example, a credit report of the customer can be retrieved by using the customer's name and any other unique data (e.g., the customer's address from the customer's identification to uniquely identify a single record (the record being a credit report).

From operation 105, the method proceeds to operation 106, which determines whether a set of identification data matches a set of record data For example, the set of identification data is the address on the identification and the set of report data is the address associated with the report retrieved. In another embodiment, the set of identification data is the name on the identification and the set of report data is the name associated with the report retrieved. There is no restriction on the amount and type of report data and identification data that can be used in order to confirm that the data from the different sources is consistent.

In an embodiment, the bank identified on the card (by either the BIN or the printed bank name on the card or both) must match a bank in which the retrieved record associated with the customer so that the card is verified as legitimate (not fraudulent).

If the identification data and the report data are not consistent (e.g., do not match), then the method proceeds to operation 108, wherein the card is not validated. This means that a message is displayed to the cashier that the validation process was not successful. In an embodiment, this can mean that the credit card provided will not be approved for use for the transaction and thus the transaction will not proceed. Optionally, the authorities can be alerted (e.g., the police local to the cashier, FBI, etc.) that a there was a fraudulent transaction being attempted.

In operation 106, if the identification data and the report data are consistent (e.g., do match), then the method proceeds to operation 107, in which the card is validated. This means that the transaction would proceed and the credit card provided would be charged for the purchase amount. Note that this method is a fraud detection method, but the credit card authorization process for the purchase (if the payment card is a credit card) would still have to be performed. For example, an authorization request would be made to the credit card servicer for the purchase amount so it can be determined whether the credit card has sufficient funds to make the purchase. The authorization can be approved (in which the transaction would be processed and completed) or the authorization could be denied (in which the transaction would not be processed). If the authorization request is not approved then a message to this effect would be displayed to the cashier.

Figure 2:
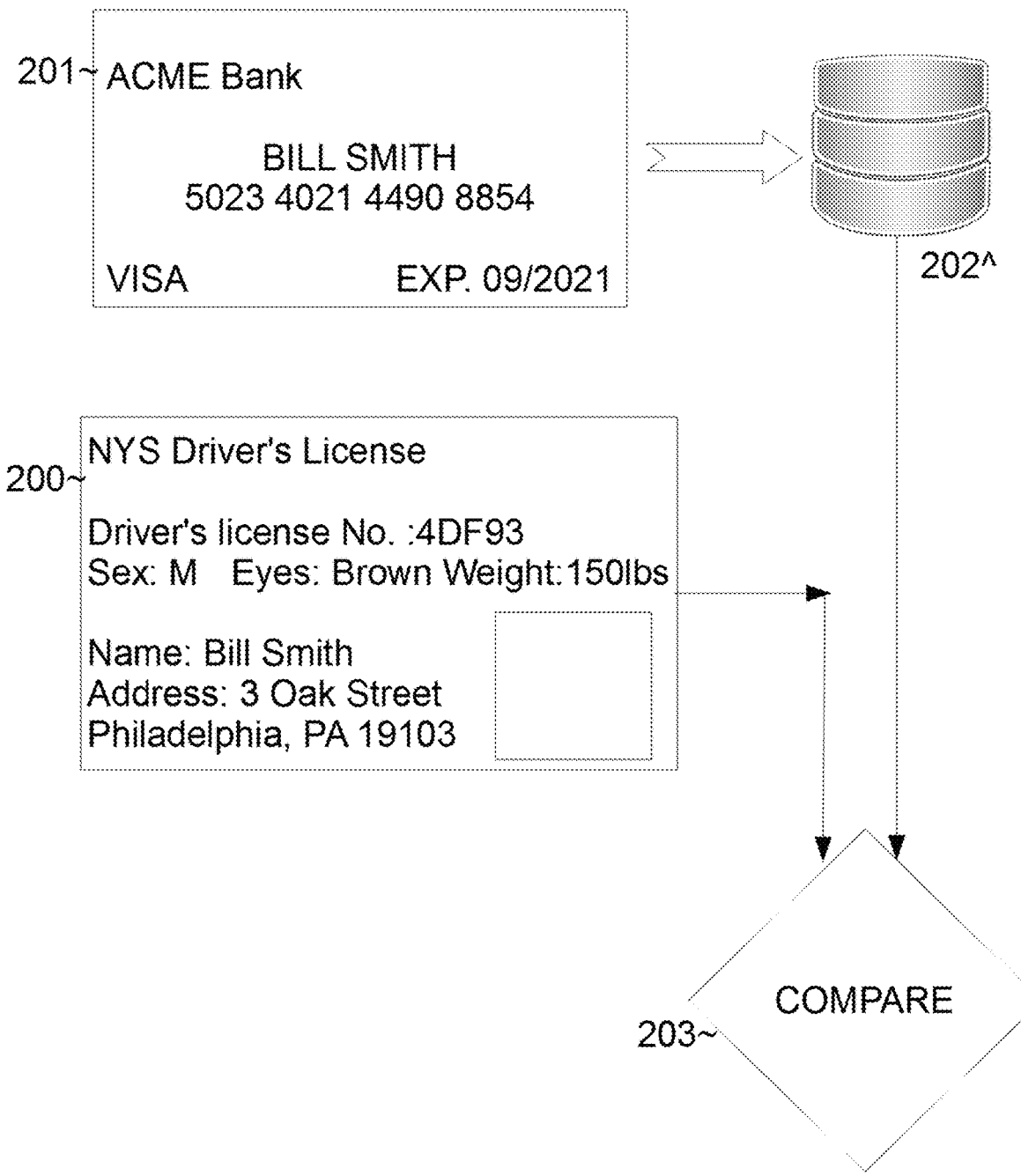
FIG. 2 is a flow diagram illustrating how data from the identification and the payment card are used to determine whether there is a match in the database, according to an embodiment.

FIG. 2 is a flow diagram illustrating how data from the identification and the payment card are used to determine whether there is a match in the database, according to an embodiment.

Payment card 201 is scanned by a scanner (e.g., optical) connected to a computer and the payment card data is extracted. Identification 200 is scanned by the scanner and the identification data is extracted.

The payment card data is used to query a database 202 (e.g., a credit reporting agency) and a record (e.g., a credit report) is retrieved by the database and transmitted back to the computer making the request.

Record data from the report is extracted and is compared 203 with the identification data. If there is a match then the verification process is successful and this result is returned electronically (and optionally visually outputted to the cashier in a message such as "verification successful). If there is no match, then this result is returned electronically (and operationally visually outputted to the cashier in a message such as "verification unsuccessful").

Figure 3:
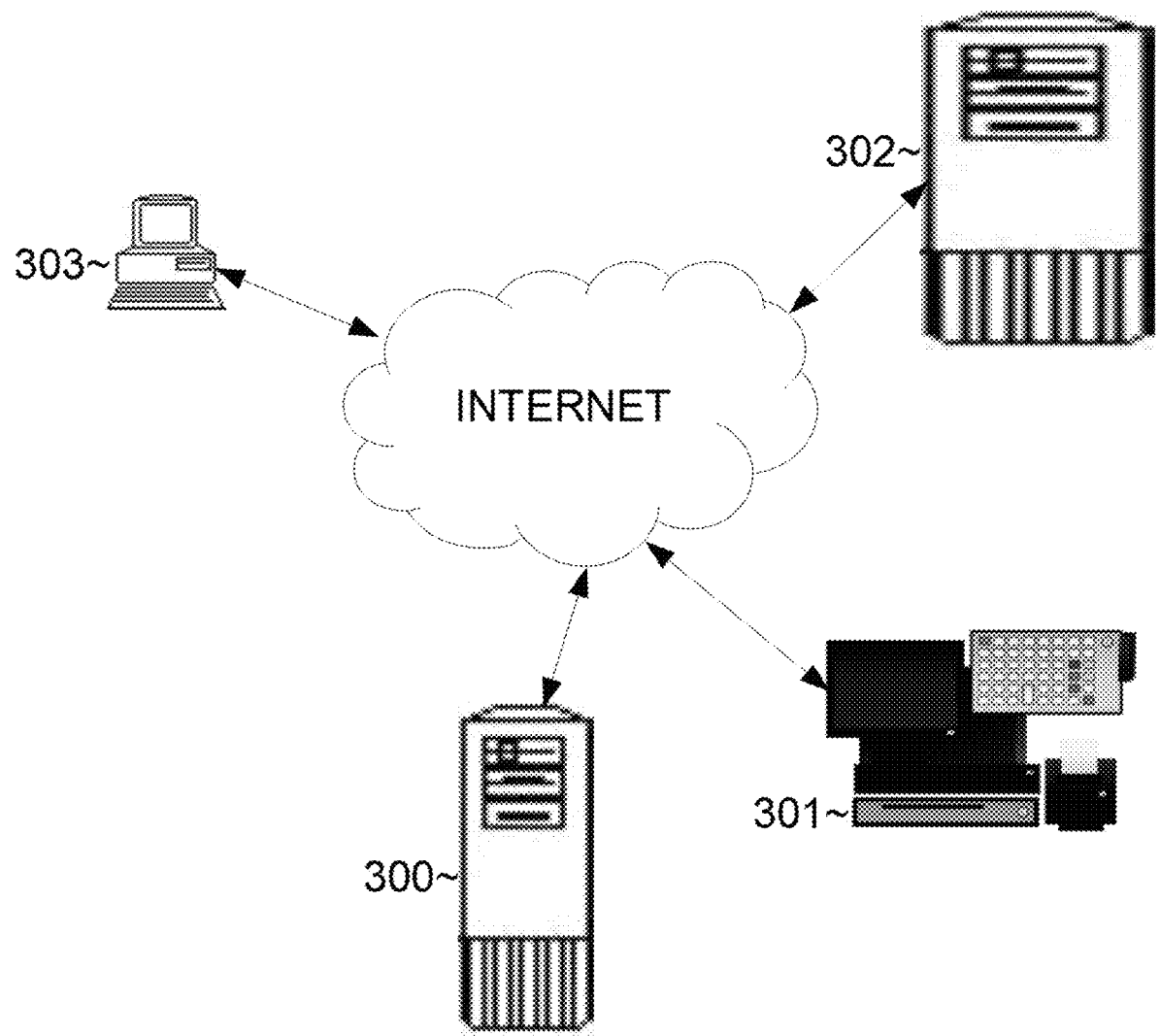
FIG. 3 is a block diagram illustrating participants of the system, according to an embodiment.

FIG. 3 is a block diagram illustrating participants of the system, according to an embodiment.

Cashier terminal 301 is operated by a cashier (or can be a self-service cashier with no human operator) and a customer will proceed to the cashier at a physical store to make a purchase. Note that the methods described herein are not limited to a cashier and can be applied to any other environment as well, such as an online purchase (wherein the customer can take and transmit pictures of their identification and credit card using their cell phone). Customer 303 can be using a remote computer and making an online purchase using the methods described herein. Database 300 is the database with the reports/records such as one or more of the credit reporting bureaus (e.g., EQUIFAX, TRANS UNION, EXPERIAN, etc.)

Approval server 302 can perform the determination of whether the transaction (or card) is validated or not. For example, operations 104 to 108 can be performed by the approval server (which is separate from the database and will be the server that queries the database 300 and receives the record back from the database 300). The cashier terminal 301 can implement operations 100 to 103 and transmit the payment card data and the identification data to the approval server 302 which will perform operations 104 to 108 and transmit the result back (in operations 107 and 108) back to the casher terminal 301.

In one embodiment, the recognition of the identification data and/or the payment card data is done at the cashier terminal (the computer physically at this terminal). In another embodiment, the images captured of the identification and/or the payment card are transmitted to the approval server 302 which then performs the recognition of the payment card data and the identification data.

Figure 4:
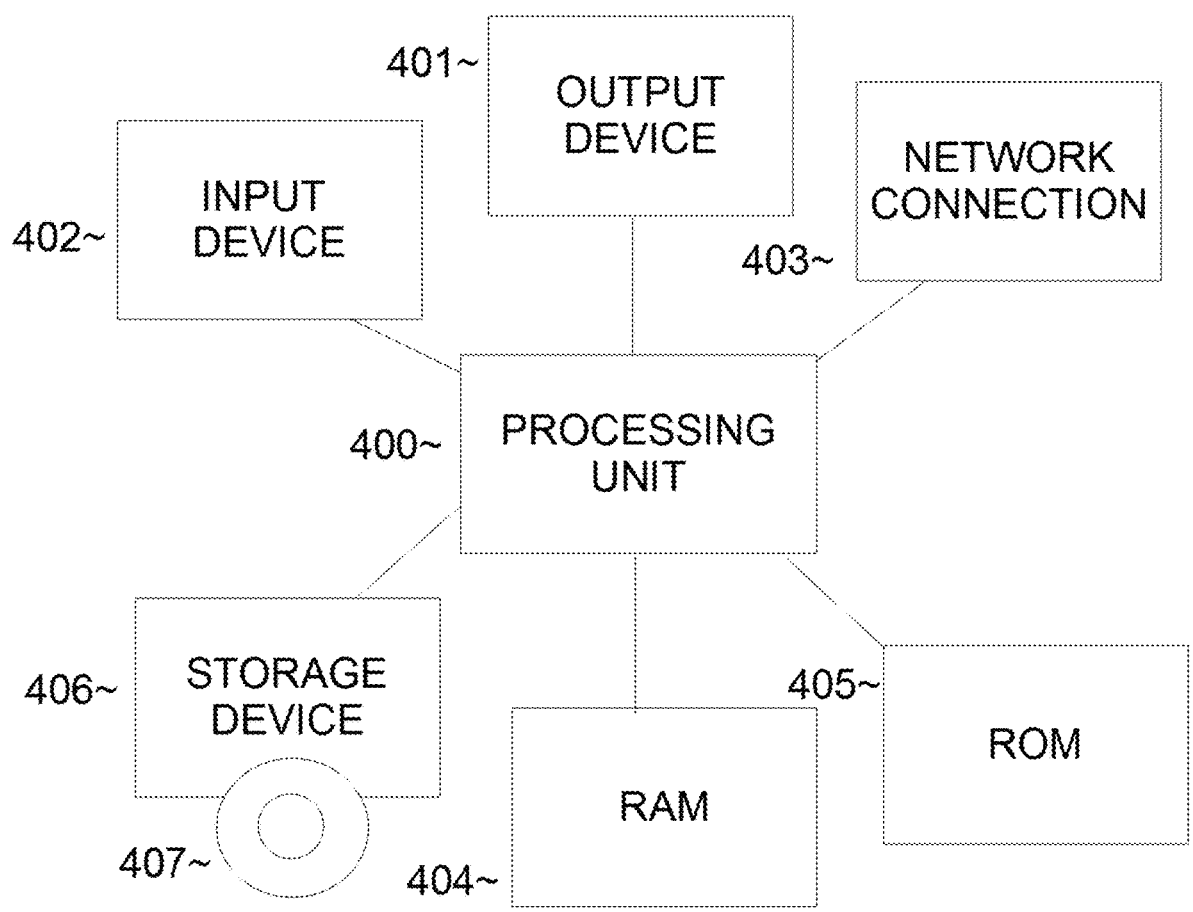
FIG. 4 is a block diagram illustrating hardware that can be used to implement a computer/device which can implement any and all of the methods described herein.

FIG. 4 is a block diagram illustrating hardware that can be used to implement a computer/device which can implement any and all of the methods described herein. The computer can be the platform, any server, personal computing device, casher terminal, cell phones, or any electronic device used as part of the system. Any and all of the methods described herein can be installed as software on the device.

A processing unit 400 (such as a microprocessor and any associated components) is connected to an output device 401 (such as an LCD monitor, touch screen, CRT, etc.) which is used to display to the user any aspect of all methods described herein (including any values described herein), and an input device 402 (e.g., buttons, a touch screen, a keyboard, mouse, etc.) which can be used to input from the user any input needed by any feature described herein. All methods and features described herein can be performed by the processing unit 400 by loading and executing respective instructions. The processing unit 400 can also be connected to a network connection 403, which can connect the processing unit 400 to a computer communications network such as the Internet, a LAN, WAN, etc. and transmit/receive all data (whether described herein or not). The processing unit 400 is also connected to a RAM 404 and a ROM 405. The processing unit 600 is also connected to a storage device 406 which can be a DVD-drive, CD-ROM, flash memory, etc. Multiple such processing units can also work in collaboration with each other (in a same or different physical location). A non-transitory computer readable storage medium 407 can store a program which can control the electronic device to perform any of the methods described herein and can be read by the storage device 406.

Note shown in FIG. 4 is a scanner (optical or other type) which is also connected to the processing unit which can be used to scan the payment card and/or the identification and transmit digital data to the processing unit so it can be processed. Typically, the cashier terminal 301 would have a scanner which can be operated by a human cashier or alternatively can be a self-service scanner operated by the customer himself/herself (e.g., the customer can insert their payment card and/or identification into a slot to be scanned (or lay it on a flatbed or hold it up to a camera). The scanner can be attached to any other component, such as the home computer or mobile phone (the camera on the mobile phone can be the scanner).

While one processing unit (or device/computer) is shown, it can be appreciated that one or more such processor/computer can work together (either in a same physical location or in different locations) to combine to implement any of the methods described herein. Programs and/or data required to implement any of the methods/features described herein can all be stored on any non-transitory computer readable storage medium (volatile or non-volatile, such as CD-ROM, RAM, ROM, EPROM, microprocessor cache, etc.) which can then be executed by one or more processing units.

All components of the system (e.g., platform, servers, computers, databases, etc.) can communicate with each other using a computer communication network (e.g., the internet) in order to exchange data as needed by the method.

Any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a (non-transitory) computer readable storage medium to control a computer. Programs and/or data required to implement any of the methods/features described herein can all be stored (and executed therefrom to perform any of the methods/features) on any non-transitory computer readable storage medium (volatile or non-volatile, such as CD-ROM, RAM, ROM, EPROM, microprocessor cache, etc.)

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A computer implemented method, the method comprising:

performing on one or more electronic processors, the following operations:

optically scanning an a driver's license;

recognizing identification data on the driver's license, wherein the identification data that was optically scanned comprises a name and address;

scanning a payment card;

recognizing payment card data on the payment card, the payment card data being a card number on the payment card;

querying a database using the payment card data, the database being a credit bureau;

receiving, in response to the querying, a record from the database comprising report data, the record being a credit report comprising a record owner's name and a record owner's address;

determining whether the name and addresses in the identification data are consistent with the name and address in the record; and transmitting a notification that the payment card is verified when the name and address in the identification data are consistent with the name and address in the record.

2. The method as recited in claim 1, further comprising, when the payment card data does not match the report data then transmitting a notification that the payment card is not verified.

3. The method as recited in claim 1, wherein the payment card is a debit card.

4. The method as recited in claim 1, wherein the payment card is a credit card.

5. The method as recited in claim 1, wherein the payment card is a stored value card.

6. The method as recited in claim 1, wherein the payment card is a bitcoin card.

7. The method as recited in claim 1, wherein the scanning the driver's license and the scanning the payment card are performed by a self-service terminal.

8. The method as recited in claim 1, further comprising requiring the record owner to provide access to an account associated with the payment card as another requirement for the payment card to be verified.

9. An apparatus, comprising:

one or more servers;

a network connection connected to the one or more servers enabling communication to the internet;

the server comprising one or more electronic processing units, the one or more electronic processing units connected to at least one computer readable storage medium, the at least one computer readable storage medium storing instructions that when executed, cause the one or more servers to:

optically scan a driver's license;

recognize identification data on the driver's license, wherein the identification data that was optically scanned comprises a name and address;

scan a payment card;

recognize payment card data on the payment card, the payment card data being a card number on the payment card;

query a database using the payment card data, the database being a credit bureau;

receive, in response to the querying, a record from the database comprising report data, the record being a credit report comprising a record owner's name and the record owner's address;

determine whether the name and address in the identification data are consistent with the name and address in the record; and transmit a notification that the payment card is verified when the name and address in the identification data are consistent with the name and address in the record.

10. The apparatus as recited in claim 9, further comprising, wherein the instructions are further programmed such that when the identification data does not match the report data then transmitting a notification that the payment card is not verified.

11. The apparatus as recited in claim 9, wherein the instructions are further programmed such that the payment card is a debit card.

12. The apparatus as recited in claim 9, wherein the instructions are further programmed such that the payment card is a credit card.

13. The apparatus as recited in claim 9, wherein the instructions are further programmed such that the payment card is a stored value card.

14. The apparatus as recited in claim 9, wherein the instructions are further programmed such that the payment card is a bitcoin card.

15. The apparatus as recited in claim 9, wherein the instructions are further programmed such that the scanning the driver's license and the scanning the payment card are performed by a self-service terminal.

16. The apparatus as recited in claim 9, wherein the instructions are further programmed to receive from the record owner information in order to provide access to an account associated with the payment card and the payment card is verified only when access to the account associated with the payment card is confirmed.

\* \* \* \* \*